(12) United States Patent
Tripathi

(10) Patent No.: US 10,241,854 B2
(45) Date of Patent: Mar. 26, 2019

(54) CORRELATION-BASED MONITORING AND EVENTS FOR A UNIFIED STORAGE MANAGER

(71) Applicant: Red Hat, Inc., Raleigh, NC (US)

(72) Inventor: Shubhendu Ram Tripathi, Karnataka (IN)

(73) Assignee: Red Hat, Inc., Raleigh, NC (US)

( * ) Notice: Subject to any disclaimer, the term of this patent is extended or adjusted under 35 U.S.C. 154(b) by 38 days.

(21) Appl. No.: 15/054,414

(22) Filed: Feb. 26, 2016

(65) Prior Publication Data

US 2017/0249199 A1    Aug. 31, 2017

(51) Int. Cl.
*G06F 11/07* (2006.01)
*H04L 29/06* (2006.01)

(52) U.S. Cl.
CPC ........ *G06F 11/079* (2013.01); *G06F 11/0727* (2013.01); *G06F 11/0751* (2013.01); *G06F 11/0787* (2013.01); *H04L 63/08* (2013.01)

(58) Field of Classification Search
CPC .............................. G06F 11/07; G06F 11/079
USPC ............................................................ 714/37
See application file for complete search history.

(56) References Cited

U.S. PATENT DOCUMENTS

| | | |
|---|---|---|
| 6,446,136 B1 | 9/2002 | Pohlmann et al. |
| 7,631,296 B2 | 12/2009 | Seshadri et al. |
| 8,610,718 B2 | 12/2013 | Suntinger et al. |
| 8,972,637 B1 | 3/2015 | Hushon, Jr. et al. |
| 9,053,000 B1 | 6/2015 | Lam et al. |
| 9,596,135 B1* | 3/2017 | Thomas .............. H04L 41/0806 |
| 9,612,924 B1* | 4/2017 | Joseph ................ G06F 11/2007 |
| 2003/0061256 A1* | 3/2003 | Mathews ............... G06Q 30/06 718/101 |
| 2005/0246582 A1* | 11/2005 | Nash ................... G06F 11/0793 714/12 |
| 2007/0112868 A1* | 5/2007 | Kolovson ............. G06F 3/0605 |
| 2008/0040191 A1 | 2/2008 | Chakravarty et al. |
| 2009/0172687 A1* | 7/2009 | Bobak ................... G06Q 10/06 718/104 |
| 2014/0059228 A1* | 2/2014 | Parikh .................. G06F 9/5005 709/226 |

(Continued)

OTHER PUBLICATIONS

Gross, Garrett, "Security Event Management and Monitoring", https://www.alienvault.com/solutions/security-event-management-and-monitoring, Jan. 19, 2016, 4 pages.

(Continued)

*Primary Examiner* — Kamini B Patel
(74) *Attorney, Agent, or Firm* — Lowenstein Sandler LLP

(57) ABSTRACT

A method of implementations includes receiving, by a processing device executing a unified storage manager (USM), notification of an event from a storage entity of a storage service managed by the USM, referencing a rule set maintained by the USM with information corresponding to the event, identifying, in view of the referencing, a rule from the rule set, executing a handler function and an action from the identified rule, the handler function to cause the event to be resolved by the storage service, determining a cascading rule from the action, executing the cascading rule to cause the event to be resolved at other storage entities associated with the storage entity corresponding to the event, and notifying, according to the action, a user of the event.

20 Claims, 5 Drawing Sheets

(56) References Cited

U.S. PATENT DOCUMENTS

| | | | |
|---|---|---|---|
| 2015/0199205 A1* | 7/2015 | Chakravarthy | G06F 9/455 718/1 |
| 2015/0363254 A1 | 12/2015 | Satoyama et al. | |
| 2016/0004634 A1* | 1/2016 | Kim | G06F 12/0246 711/103 |
| 2016/0028806 A1* | 1/2016 | Wareing | H04L 67/1095 709/217 |
| 2016/0334998 A1* | 11/2016 | George | G06F 3/0608 |
| 2016/0378450 A1* | 12/2016 | Fu | G06F 8/61 717/177 |
| 2017/0192868 A1* | 7/2017 | Vijayan | G06F 11/1662 |
| 2017/0249088 A1* | 8/2017 | Thomas | G06F 3/0607 |

OTHER PUBLICATIONS

Alienvault Technical Paper, "Unified Security Management vs. SIEM", http://www.securelabs.nl/wp-content/uploads/2014/09/AV-USM-v-SIEM-Whitepaper.pdf, Sep. 2014, 10 pages.

Ding, Jianwei et al., Department of Computer Science and Technology, Tsinghua University, China, Institute of Information System & Engineering, School of Software, Tsinghua University, China, "LCAD: A Correlation Based Abnormal Pattern Detection Approach for Large Amount of Monitor Date", 9 pages, 2014.

* cited by examiner

CORRELATION-BASED MONITORING AND EVENTS FOR A UNIFIED STORAGE MANAGER

TECHNICAL FIELD

This disclosure relates to computing resources, and more particularly, to correlation-based monitoring and events for a unified storage manager (USM).

BACKGROUND

Growth of data in many industries is overwhelming hardware-based storage. Software-defined storage platforms provide a solution for scaling storage across physical, virtual, and cloud resources. There are various storage providers that can be used for software-based storage services. These storage providers have different features and properties. Currently, interacting with a particular storage provider requires knowledge of the specific features of the underlying storage service. Moreover, when a storage system fails, it is important to identify a root cause of such a failure and to identify how the failure impacts other components of the storage service.

DESCRIPTION OF DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
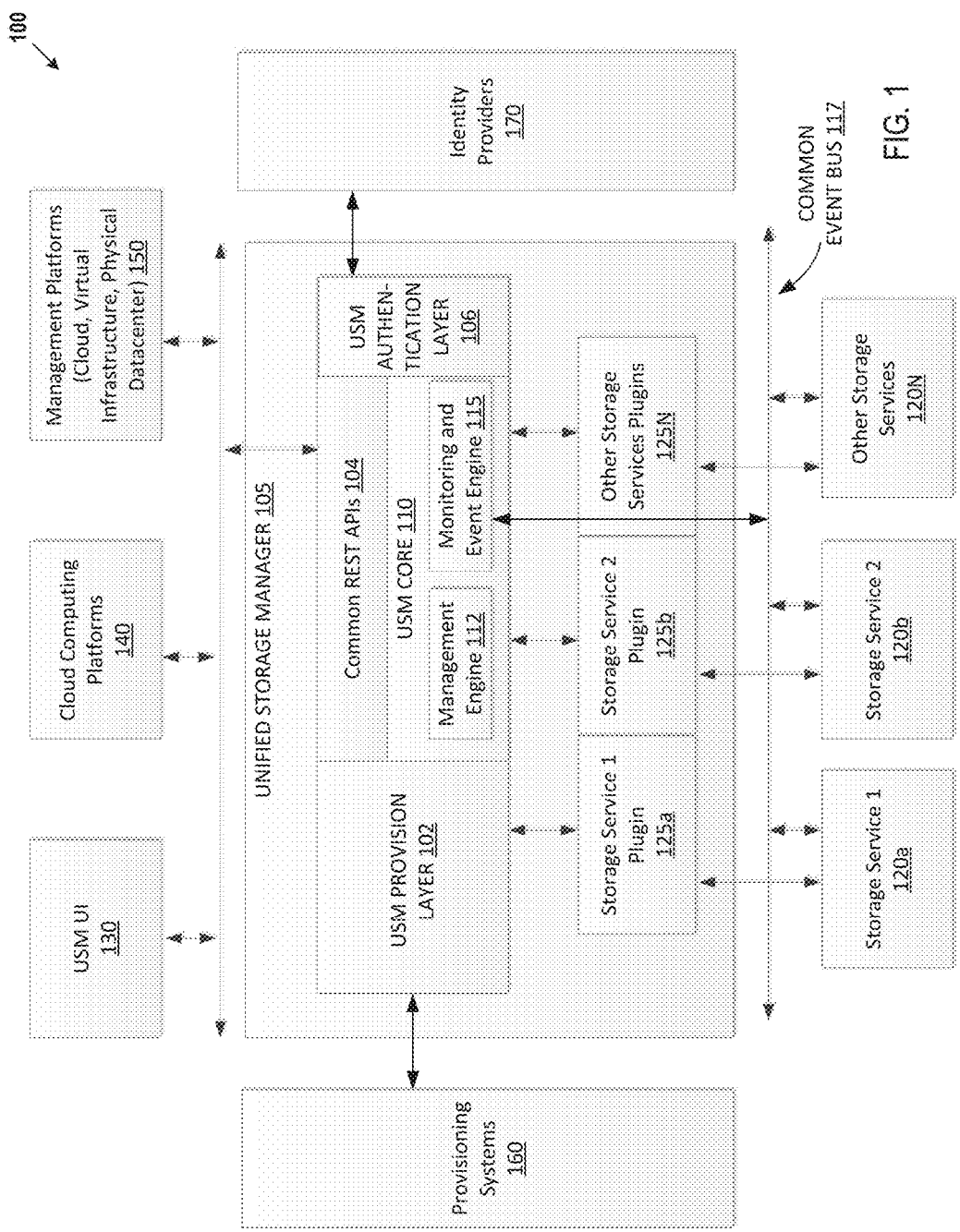
FIG. 1 is a block diagram that shows an example of a system architecture for a unified storage manager (USM).

Aspects and implementations of the disclosure are directed to correlation-based monitoring and events for a unified storage manager (USM). The USM enables alerting and notification to a USM user (e.g., a system administrator) regarding changes occurring in underlying storage services managed by the USM. Such changes may be referred to herein as "events". Events may include malfunctions and/or faults in an underlying storage node or storage entity (e.g., physical or logical storage construct including, but not limited to, file, disk, cluster, volume, brick, etc.) of the storage service and/or changes in functioning of physical resources (e.g., CPU utilization, memory utilization, and load exceeding threshold performance levels) of the storage service. An event daemon (e.g., a computer program that runs a background process, rather than being under the direct control of an interactive user, in particular the event daemon may provide a variety of plugins for capturing physical details of the storage node) executing on the storage nodes may collect and send events via a bus that passes the events to a monitoring and event engine of the USM.

The monitoring and event engine of the USM monitors the performance and availability of the various storage nodes and storage entities and provides alerts and notifications in view of the monitoring. The monitoring and event engine also detects, isolates, correlates, and generates notifications and/or alerts regarding any malfunctions/faults in the underlying storage nodes and their associated logical storage resources (e.g., volumes, clusters, bricks, etc.). When a fault occurs, the monitoring and event engine is responsible for performing event correlation on the event to determine a root cause of the event and propagate the status up in the tiers of logical resources (e.g., node, brick, volume) of the underlying storage service. Event correlation may refer to connecting identifying information included with an event, such as an entity type, an event type and/or an event value, to a matching rule in the rule set maintained by the monitoring and event engine.

The monitoring and event engine may utilize a monitoring and event rule set to process, correlate, and propagate received events. In one implementation, cascading of rules or correlation-based notifications cascading to other storage entities is defined using the rule set. Cascading of rules refers to an individual rule causing another rule to be invoked and processed by the monitoring and event engine. The rule set may be defined by the individual storage services and provided to the USM for use by the monitoring and event engine. The rule sets may encompass each type of storage entity (e.g., volume, brick, cluster, etc.) of a storage service and each type of event encountered in the operations of the storage service.

Conventional storage system solutions rely on manual evaluations to determine a root cause of a fault in the underlying storage entities and to determine how the fault impacts other components of the storage services. This is a complicated and error-prone task. Implementations of the disclosure can provide a monitoring and event engine that processes, correlates, and propagate received events without user interaction.

FIG. 1 is an example system architecture 100 in which implementations of the present disclosure can be implemented. The system architecture 100 can include a unified storage manager (USM) 105. The USM 105 can be implemented on one or more machines (e.g., server computers, desktop computers, etc.). The USM 105 is a system that deploys, manages, and monitors multiple different storage services, such as storage service 120a, storage service 2 120b, and other storage services 120N. A storage service refers to a system (e.g., a file system) that manages computer storage space (e.g., controls how data is stored and retrieved). Example storage services 120a-120N can include GlusterFS®, Ceph® storage, and so on. The USM 105 provides a pluggable framework to allow for interaction with each of the storage services 120a-120N. A pluggable framework refers to the USM 105 utilizing plugins 125a-125N that enable communication (e.g., via Representational State Transfer (REST) application programming interfaces (APIs) or via Salt configuration management software and remote execution engine) with the corresponding storage services 120a-120N. A plugin refers to a component that adds a specific feature to an existing computer program. The USM 105 provides services that the plug-in 125a-125N can use, including a way for the plugin 125a-125N to register itself with the USM 105 and a protocol for the exchange of data with the plugin 125a-125N.

USM 105 also manages configuration of underlying storage nodes (not shown) of the storage services 120a-120N. A storage node may be a physical computing machine with its own local persistent storage, either disk or solid state, and may also include a CPU with one or more cores, memory, and an Internet Protocol (IP) address. Storage nodes may be provisioned to provide storage for a storage service, such as any of storage services 120a-120N, managed by the USM 150. Storage nodes may be part of one or more logical resources (e.g., cluster, volume, block, disk, brick, etc.) of the storage service 120a-120N to which the storage node is provisioned.

USM 105 may be communicably coupled to storage services 120a-120N and their underlying storage nodes and storage entities, as well as to other external providers (e.g., external provisioning systems 160, external identity providers 170, etc.) via a communication interface such as a bus or a network. The network may be a private network (e.g., a local area network (LAN), a wide area network (WAN), intranet, or other similar private networks) or a public network (e.g., the Internet).

USM 105 exposes application programming interfaces (APIs) 104, such as Representational State Transfer (REST) APIs 104, which are consumed via USM user interface (UI) 130 and by other USM 105 customers, such as cloud computing platforms 140 and other management platforms 150. One example cloud computing platform 140 may include Red Hat® OpenStack®. An example management platform 150 may include Red Hat® CloudForms®. USM 105 implements all framework-level functionalities such as authentication, authorization logging, and so on. USM 105 includes a USM core 110 having a management engine 112 that manages the configuration of underlying storage nodes utilized by the storage services 120a-120N. USM core 110 further includes a monitoring and event engine 115 that ensures the performance of storage nodes and storage entities at acceptable levels, as well as recognizes, isolates, and logs faults that occur at the storage node and storage entity levels.

Management engine 112 manages configuration of storage nodes through providers of storage services 120a-120N. Generic APIs like host management, authentication, and authorization are implemented in the USM core 110. However, the provider-specific API requests are routed to the respective providers of storage services 120a-120N via the corresponding plugins 125a-125N for those storage services 120a-120N. In one implementation, USM core 110 may execute a HyperText Transfer Protocol (HTTP) server that receives REST requests, which are parsed and routed to appropriate modules of the USM 105 (e.g., core modules 112, 115, USM provisioning layer 102, USM authentication layer 106, or the respective storage service providers 125a-125N).

In the case of synchronous requests, the USM core 110 waits for the completion of the request, forms an HTTP response, and sends it back to the caller. Asynchronous requests return immediately with a task ID. The user can query the status of the task using the REST APIs provided. The USM core 110 can implement a data store service, such as Mongodb®, for persisting the configurations of various storage entities.

USM 105 includes a USM provisioning layer 102 that is responsible for provisioning storage nodes for use by the storage services 120a-120N. The provisioning layer 102 handles providing the storage nodes with operating system, file system, and storage software packages to be consumed by users. USM provision layer 102 enables provisioning a storage node through external provision systems 106, such as Satellite®, Puppet®, and Foreman®, to name a few examples. The USM provisioning layer 102 and the external provision systems 160 may communicate via APIs. USM 105 provides a pluggable framework through which any external provision system can be integrated.

USM 105 also includes a USM authentication layer 106 that is responsible for identifying individuals in a system and controlling their access to resources within or across enterprise boundaries by associating user rights and restrictions with the established individual. The USM authentication layer 106 enables identity management through external identity providers 180, such as IPA®, OpenLDAP®, Directory Server®, and AD®, to name a few examples. The USM authentication layer 106 and the external identity providers 170 may communicate via APIs. USM 105 provides a pluggable framework through which any external identity provider can be integrated.

In one implementation, the monitoring and event engine 115 of USM core 110 enables alerting and notifying a USM 105 user (e.g., a system administrator) of changes occurring in underlying storage services 120a-120N. Such changes may be referred to herein as "events". Events may include malfunctions and/or faults in an underlying storage node or storage entity (e.g., faults in any of files, cluster, volumes, blocks, bricks, etc.) and changes in functioning of physical resources (e.g., CPU utilization, memory utilization, load, etc. exceeding threshold performance levels) of the storage nodes of a storage service 120a-120N. Storage services 120a-120N may collect and send events via a common event bus 117 that passes the events to the monitoring and event engine 115.

Figure 2:
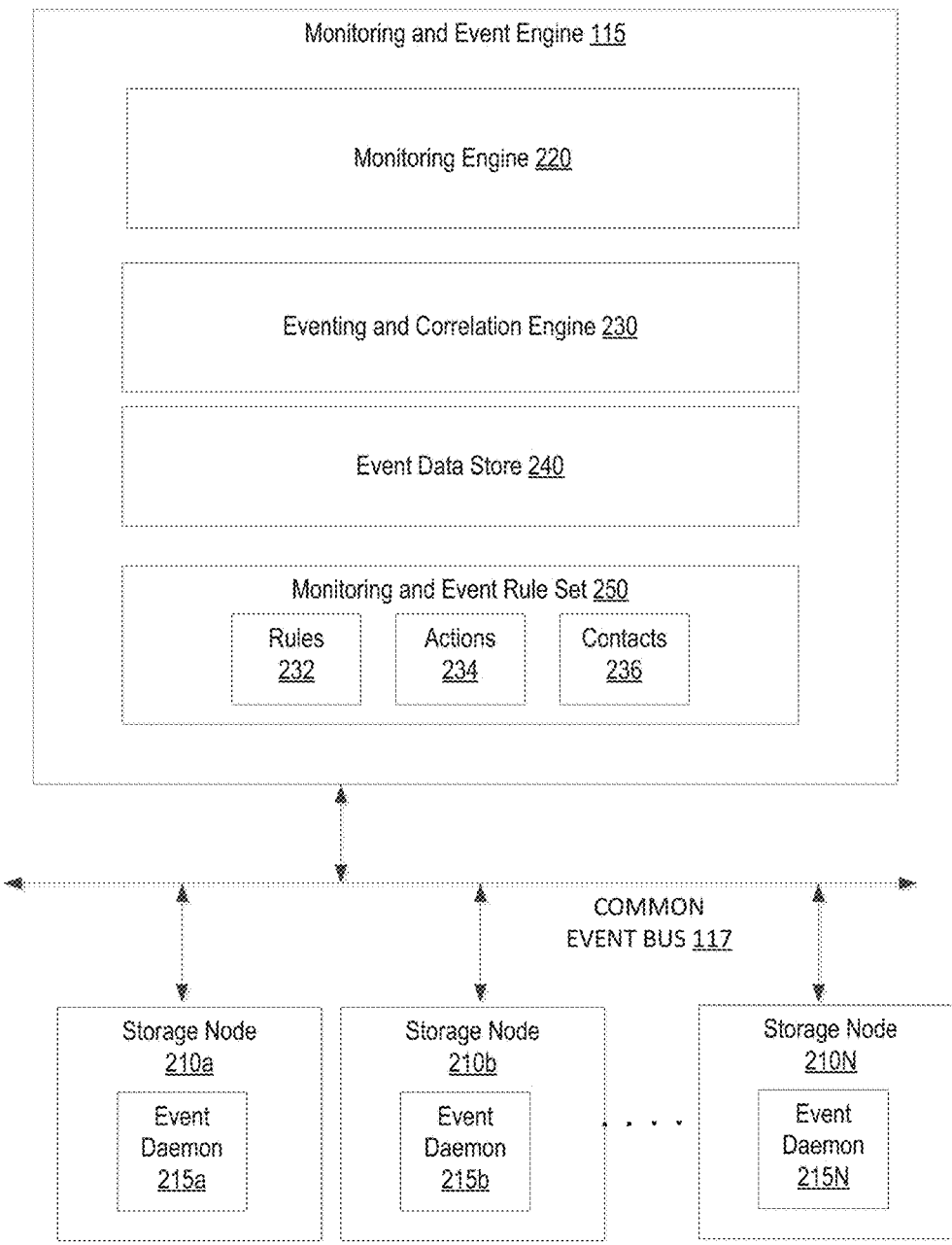
FIG. 2 is a block diagram that shows an example of a monitoring and event engine of an USM architecture.

FIG. 2 is a block diagram of monitoring and event engine 115 according to implementations of the disclosure. In one implementation, monitoring and event engine 115 is the same as its counterpart described with respect to FIG. 1. Monitoring and event engine 115 may be communicably coupled to one or more storage nodes 210a-210N providing storage resources for the storage service providers integrated with the USM. Each of storage nodes 210a-210N may be a physical computing machine with its own local persistent storage, either disk or solid state, and may also include a CPU with one or more cores, memory, and an Internet Protocol (IP) address. Storage nodes 210a-210N may be provisioned to provide storage for a storage service, such as any of storage services 120a-120N, managed by the USM 150 as described with respect to FIG. 1. Storage nodes 210a-210N may be part of one or more logical resources (e.g., cluster, volume, block, disk, brick, etc.) of the storage service to which the storage node 210a-210N is provisioned.

Monitoring and event engine 115 may include a monitoring engine 220, an eventing and correlation engine 230, an event data store 240, and a monitoring and event rule set 250. The monitoring engine 220 monitors the performance and availability of various entities and provides alerts and notifications in view of the monitoring. The monitoring engine 220 identifies events occurring in the overall storage service system and makes it easier for a system administrator to decide a plan of action accordingly.

Each storage node 210a-210N executes an event daemon 215a-215N that collects event details from its corresponding storage node 210a-210N and reports these collected events to the monitoring and event engine 115. A daemon refers to a computer program that runs a background process, rather than being under the direct control of an interactive user. The event daemon 215a-215N may provide a variety of plugins for capturing physical details of the storage node 210a-

210N, such as CPU utilization, memory utilization, load, input/output (I/O) operations usage, and so on. The event daemon 215a-215N can also analyze the collected data, and detect a breach in configured threshold levels for the corresponding physical resources. When a threshold breach is detected, the event daemon 215a-215N can generate an event to send to the monitoring and event engine 115 via common event bus 117. In one implementation, common event bus 117 is the same as its counterpart described with respect to FIG. 1.

The events received at monitoring and event engine 115 may be stored in event data store 240. In some implementations, the monitoring engine 210 may locally monitor logical resources of the storage service (e.g., cluster, volumes, etc.) for event detection purposes (e.g., volume nearly full, etc.), and may generate events locally at the monitoring engine 210. The monitoring engine 210 may expose REST APIs that can be used for querying the historical event data stored in event data store 240 for graphing and reporting purposes.

The monitoring and event engine also includes an eventing and correlation engine 230. The eventing and correlation engine 230 includes logic to detect, isolate, correlate, and generate notifications/alerts for any malfunctions and/or faults in the underlying storage nodes 210-210N and their associated logical storage resources. The event daemon 215a-215N at each storage node 210a-210N may also be programmed to capture malfunction/faults at the corresponding storage node 210a-210N, as well as configuration changes at the storage node 210a-210N. When a malfunction, fault, or configuration change occurs, the event daemon 215a-215N at the storage node 210a-210N sends an event to the monitoring and event engine 115. The eventing and correlation engine 230 is responsible for performing event correlation on such events to determine a root cause and propagate the status up in the tiers of logical resources of the underlying storage service. Event correlation may refer to connecting identifying information included with an event, such as an entity type (e.g., file, disk, volume, cluster, brick, block, etc.), an event type (e.g., status), and an event value (e.g., down, lost) to a matching rule in the rule set 250 maintained by the monitoring and event engine 115.

The eventing and correlation engine 230 may utilize the monitoring and event rule set 250 to process, correlate, and propagate received events. In one implementation, cascading of rules or correlation-based notifications cascading to other storage entities could be defined using the rule set 250. Cascading of rules refers to an individual rule causing another rule in the rule set 250 to be invoked and processed by the eventing and correlation engine 230. The rule set 250 may be defined by the individual storage services and provided to the USM for use by the monitoring and event engine 115. The rule sets 250 may encompass each type of storage entity (e.g., disk, volume, cluster, block, brick, etc.) of a storage service and each type of event encountered in the operations of the storage service. The rule sets may include rules 232, actions 234, and contacts 236. Examples of the rules 232, actions 234, and contacts 236 are described below.

In one implementation, the rule set 250, including the rules 232, actions 234, and contacts 236, could be defined in the form of a JavaScript Object Notation (JSON) object, such as shown in the examples below:

```
{
    Rules: [
        {
            Rule Name: volume_down_event
            EntityType: gluster_volume
            EventType: status
            EventValue: down
            HandlerFunc: <Handler function for this event>
            Action: action_id_email
        }
        {
            Rule Name: server_quorum_last_event
            EntityType: gluster_cluster
            EventType: status
            EventValue: lost
            HandlerFunc: <Handler function for this event>
            Action: action_id_sms
        }
    ]
    Actions: [
        {
            Name: actions_id_email
            Cascade: true/false
            CascadeRule: <RuleName>
            ActionType: email
            ContactDetails: {contact_id_email}
        }
        {
            Name: actions_id_sms
            Cascade: true/false
            CascadeRule: <RuleName>
            ActionType: sms
            ContactDetails: {contact_id_sms}
        }
    ]
    Contacts: [
        {
            Name: contact_id_email
            ContactDetail: "mailto::abc@xyz.com,def@xyz.com"
        }
        {
            Name: contact_id_sms
            ContactDetail: "sms::<Mob>"
        }
    ]
}
```

In above rule definitions, CascadeRule name indicates that the event is to be cascaded to a next level. The value for this would decide which rule takes care of the next level of correlated event and how. Furthermore, in the above rule definitions, HandlerFunc values define the actual storage service-specific functions that would take care of changing the entity state, and so on, as part of rule. The eventing and correlation engine 230 would invoke these handler functions in view of definitions in the rule set file and for a specific event. In some implementations, the handler functions involve marking a particular storage resource in a warning or alarm state. The monitoring and event engine 115 may access and update configuration and status data related to the corresponding storage resource and maintained by the USM.

The notifications, such as email, short message service (SMS), and Simple Network Management Protocol (SNMP) traps, for example, would be taken care of by standard functions defined within the USM and details for the same would be picked from the rule set file.

The eventing and correlation engine 230 also exposes REST APIs that can be used by a user of the USM for retrieving the list of events, acknowledging, and resolving them.

The following description provides example use cases of utilization of the monitoring and event engine 115, including implementing event correlation and cascading of rules. In a first example, a disk in GlusterFS® becomes faulty. The event and monitoring engine 115 is notified of the faulty disk by the event daemon 215a-215N of the storage node 210a-210N corresponding to the faulty disk. The rule sets 240 are referenced by the monitoring engine 220 and eventing and correlation engine 230 in order to: (1) mark the corresponding GlusterFS® brick degraded in view of type of volume (replicated/distributed), (2) mark the respective volume as degraded, (3) raise alert at the respective volume level, and (4) raise a notification email/SMS, if indicated. Each of steps (1) through (4) may be implemented by a rule in the rule set 250, where the rule for step (1) cascades to the rule for step (2), and so on. In addition, the event of the fault GlusterFS® disk was initially correlated to the rule for step (1).

In a second example, the event daemon 215a-215N on a storage node 210a-210N determines that CPU usage is consistently high on the storage node 210a-210n. The event daemon 215a-215N generates and sends an event to the monitoring and event engine 115. The rule sets 240 are referenced with the event, and the monitoring and event engine 115 performs the following, in view of the event and rule sets 240: (1) Marks the storage node 210a-210N in warning/alarm state, (2) a respective cluster where the storage node participates is marked with an alert, and (3) a notification email/SMS is raised, if indicated.

In a third example, the event daemon 215a-215N on a storage node 210a-210N determines that disk usage crosses a configured threshold level on the storage node 210a-210n. The event daemon 215a-215N generates and sends an event to the monitoring and event engine 115. The rule sets 240 are referenced with the event, and the monitoring and event engine 115 performs the following, in view of the event and rule sets 240: (1) mark the respective brick with alert, (2) mark the respective volume with alert, and (3) raise notification (email/SMS), if indicated.

In a fourth example, the event daemon 215a-215N on a storage node 210a-210N determines that memory usage is consistently high on the storage node 210a-210n. The event daemon 215a-215N generates and sends an event to the monitoring and event engine 115. The rule sets 240 are referenced with the event, and the monitoring and event engine 115 performs the following, in view of the event and rule sets 240: (1) storage node 210a-210N is marked in warning/alarm state, (2) respective cluster where storage node 210a-210N participates is marked with alert, and (3) a notification email/SMS is raised, if indicated.

In a fifth example, the event daemon 215a-215N on a storage node 210a-210N determines that input/output (I/O) operation usage is consistently high on the storage node 210a-210n. The event daemon 215a-215N generates and sends an event to the monitoring and event engine 115. The rule sets 240 are referenced with the event, and the monitoring and event engine 115 performs the following, in view of the event and rule sets 240: (1) storage node 210a-210N is marked in warning/alarm state, (2) respective cluster where storage node 210a-210N participates is marked with alert, and (3) a notification email/SMS is raised, if indicated.

In a sixth example, the monitoring engine 210 may determine that a volume is nearly full (e.g., in view of data received from event daemons 215a-215N). The rule sets 240 are referenced with the event, and the monitoring and event engine 115 performs the following, in view of the event and rule sets 240: (1) mark the volume with alert, (2) mark the respective cluster with alert, and (3) raise the notifications (if indicated).

Figure 3:
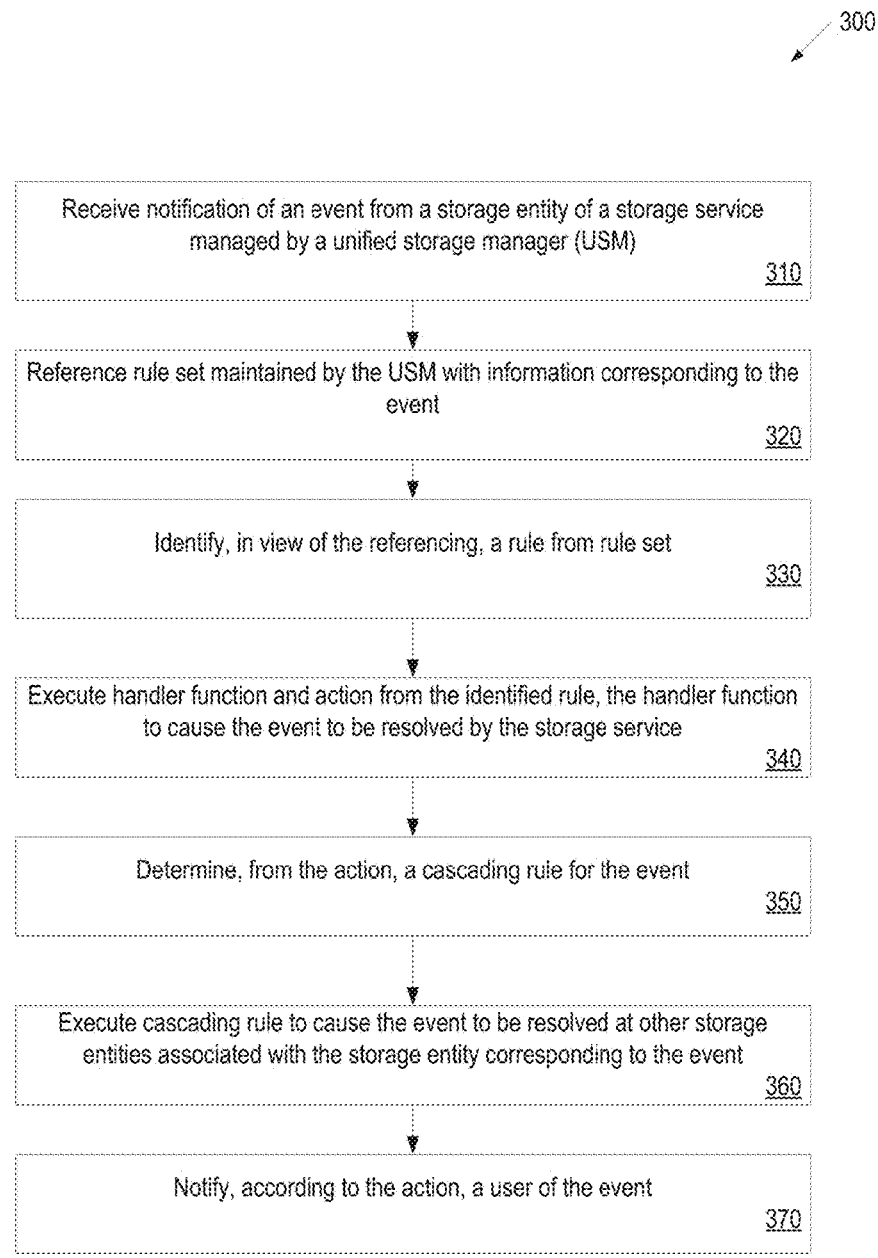
FIG. 3 is flow chart that shows an example of a process for correlation-based monitoring and events in an USM architecture.

FIG. 3 is a flow diagram for a method 300 for correlation-based monitoring and events for a USM, in accordance with one or more implementations of the present disclosure. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by a monitoring and event engine (e.g., monitoring and event engine 115 of FIG. 1) executed by a processing device in a computing machine. At least a portion of method 300 can be performed by the computing machine without user interaction.

At block 310, the processing device receives notification of a generated event from a storage entity of a storage service managed by a USM. At block 320, a rule set is referenced with information corresponding to the generated event. At block 330, a rule from the rule set to apply to the event is determined. Then, at block 340, a handler function and an action from the determined rule are applied. A handler function may refer to the actual storage service-specific functions that handle changing the state of a storage entity state. An action from the rule set may refer to a process that causes an alert or a notification to be generated by the USM. At block 350, a cascading rule is determined, from the applied action, to apply to the event. A cascading rule may be an indication that an event should be cascaded to (e.g., sent on to) a next level of rule. The value a cascading rule identifies another rule that takes care of a next level of correlated event and how. Subsequently, at block 360, the cascading rule is applied. Lastly, at block 370, a user is notified of the event.

Figure 4:
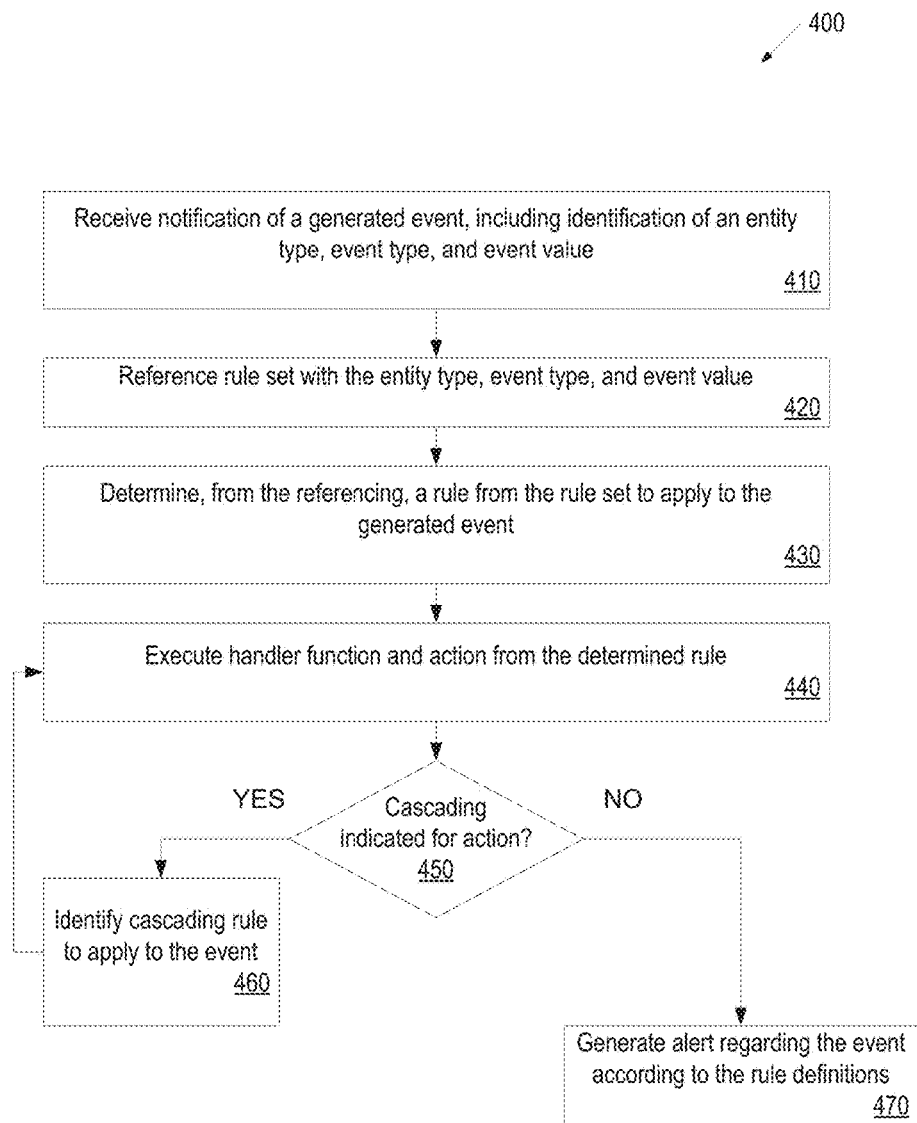
FIG. 4 is flow chart that shows an example of another process for correlation-based monitoring and events in an USM architecture.

FIG. 4 is a flow diagram for another method 400 for correlation-based monitoring and events for a USM, in accordance with one or more implementations of the present disclosure. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a monitoring and event engine (e.g., monitoring and event engine 115 of FIG. 1) executed by a processing device in a computing machine. At least a portion of method 400 can be performed by the computing machine without user interaction.

At block 410, the processing device receives notification of a generated event corresponding to a storage entity of a storage service managed by a USM. The notification includes identification of an entity type, an event type, and an event value. At block 420, a rule set maintained by the USM is references with the entity type, event type, and event value. At block 430, a rule from the rule set is determined from the referencing. The rule is to apply to the generated. Subsequently, at block 440, a handler function and an action from the determined rule are executed.

At decision block 450, it is determined whether cascading is indication for the action of the determined rule. If so, then method 400 proceeds to block 460, where the cascading rule is identified to apply to the event. Method 400 returns to block 440 to execute the handler function and action from the determined cascading rule. Method 400 then proceeds to decision block 450 to determine whether any other cascading rules apply to the event.

If at decision block 450, cascading is not indicated for the action of the current rule, then method 400 proceeds to block 470. At block 470, an alert is generated regarding the event according to definitions found in the rule.

Figure 5:
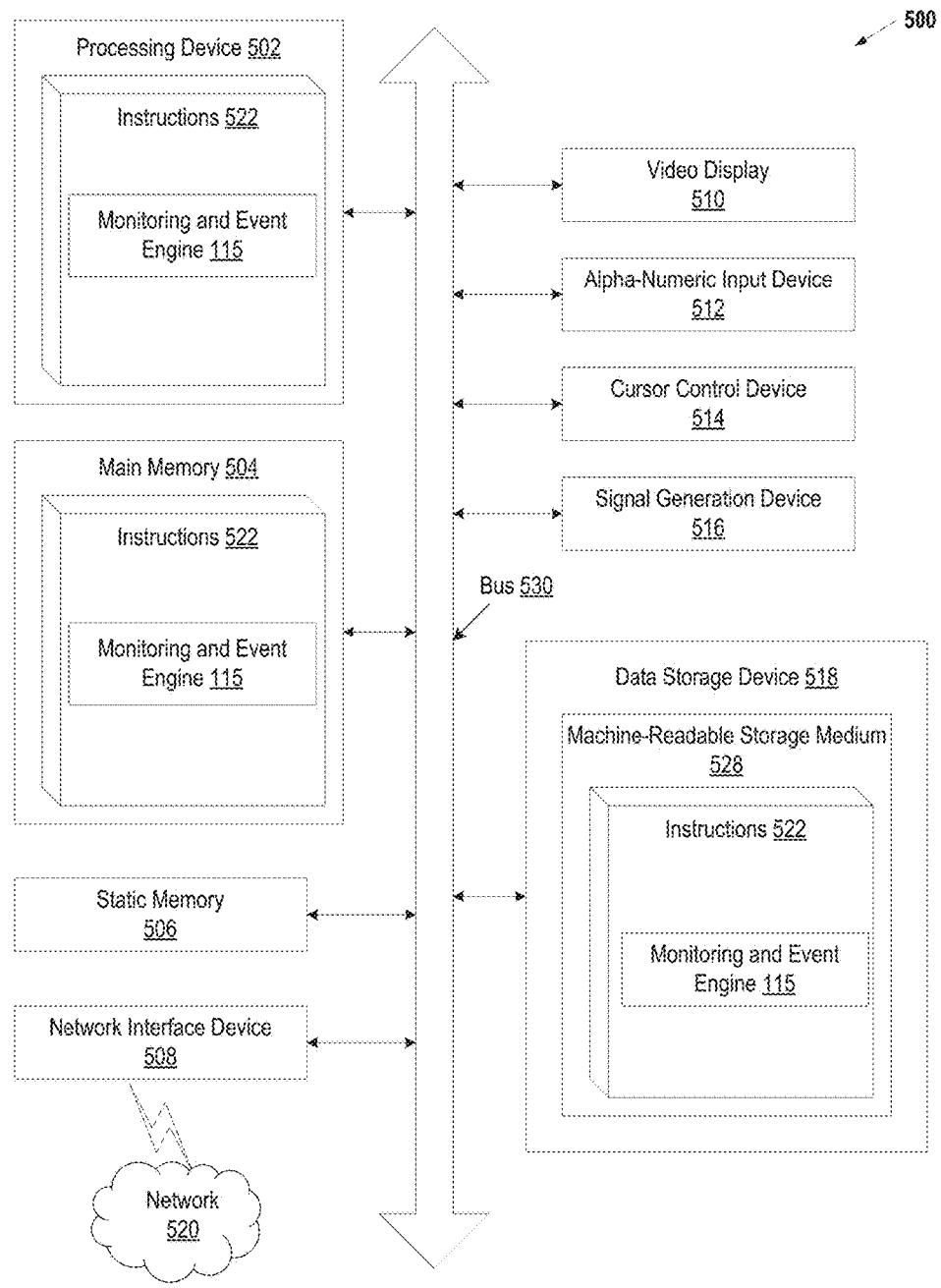
FIG. 5 is a schematic diagram that shows an example of a computing system.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data store device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT), an alphanumeric input device 512 (e.g., a keyboard), a cursor control device 514 (e.g., a mouse), and a signal generation device 516 (e.g., speaker).

The data storage device 518 may include a machine-readable storage medium 528 (also known as a computer-readable medium) on which is stored one or more sets of instructions or software 522 embodying any of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for monitoring and event engine 115 (e.g., monitoring and event engine 115 of FIG. 1), and/or a software library containing methods that call the monitoring and event engine 115. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the noted purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device executing a unified storage manager (USM), notification of an event from a storage entity of a storage service of a plurality of storage services managed by the USM, wherein each of the plurality of storage services correspond to a different file system of a plurality of file systems that manage computer storage space;
   referencing, by the processing device, a rule set maintained by the USM with information corresponding to the event;
   identifying, by the processing device in view of the referencing, a rule from the rule set;
   executing, by the processing device, a handler function and an action from the identified rule, the handler function to cause the event to be resolved by the storage service;
   determining, by the processing device, a cascading rule from the action;
   executing, by the processing device, the cascading rule to cause the event to be resolved at other storage entities associated with the storage entity corresponding to the event; and
   notifying, by the processing device according to the action, a user of the event.

2. The method of claim 1, wherein the event comprises at least one of a fault in the storage entity or a monitored resource of the storage entity triggering a threshold value configured for the monitored resource.

3. The method of claim 1, wherein the storage entity comprises at least one of a storage node, a volume, a cluster, or a brick.

4. The method of claim 1, wherein the plurality of storage services comprise at least one of GlusterFS® file system or Ceph® file system, and wherein the USM provides a framework to receive a plugin application of each of the plurality of storage services that enables the USM to manage the respective storage service.

5. The method of claim 1, wherein the event is received from a daemon executing on a storage node comprising the storage entity.

6. The method of claim 1, wherein the event is generated by a monitoring engine of the USM in view previous events received from at least one of the storage entity or the other storage entities associated with the storage entity.

7. The method of claim 1, wherein identifying the rule further comprises matching an entity type, an event type, and an event value of the event to corresponding attributes of the rule.

8. The method of claim 1, wherein the action comprises contact information of the user to utilize for notifying the user of the event.

9. A non-transitory computer-readable medium having instructions stored therein that, when executed by a processing device, cause the processing device to:
   receive, by the processing device executing a unified storage manager (USM), notification of an event from a storage entity of a storage service of a plurality of storage services managed by the USM, the event comprising an entity type, an event type, and an event value, wherein each of the plurality of storage services correspond to a different file system of a plurality of file systems that manage computer storage space;
   identify, by the processing device, a rule from the rule set in view of the entity type, event type, and the event value;
   execute, by the processing device, a handler function and an action from the identified rule, the handler function to cause the event to be resolved by the storage service;
   identify, by the processing device, a cascading rule from the action; and
   executing, by the processing device, the cascading rule to cause the event to be resolved at other storage entities associated with the storage entity corresponding to the event.

10. The non-transitory computer-readable medium of claim 9, wherein the event comprises at least one of a fault in the storage entity or a monitored resource of the storage entity triggering a threshold value configured for the monitored resource.

11. The non-transitory computer-readable medium of claim 9, wherein the storage entity comprises at least one of a storage node, a volume, a cluster, or a brick.

12. The non-transitory computer-readable medium of claim 9, wherein the plurality of storage services comprise at least one of GlusterFS® file system or Ceph® file system, and wherein the USM provides a framework to receive a plugin application from each of the plurality of storage services that enables the USM to manage the respective storage service.

13. The non-transitory computer-readable medium of claim 9, wherein the event is received from a daemon executing on a storage node comprising the storage entity.

14. The non-transitory computer-readable medium of claim 9, wherein the event is generated by a monitoring engine of the USM in view previous events received from at least one of the storage entity or the other storage entities associated with the storage entity.

15. The non-transitory computer-readable medium of claim 9, wherein the action comprises notifying a user of the event, and wherein the rule set comprises contact information of the user.

16. A system comprising:
   a memory to store a rule set for a storage service of a plurality of storage services managed by a unified storage managed (USM), wherein each of the plurality of storage services correspond to a different file system of a plurality of file systems that manage computer storage space; and a processing device communicably coupled to the memory, the processing device to:
  execute the USM to manage the storage service;
  receive notification of an event from a storage entity of the storage service;
  reference the rule set with information corresponding to the event;
  identify, in view of the referencing, a rule from the rule set;
  execute, by the processing device, a handler function and an action from the identified rule, the handler function to cause the event to be resolved by the storage service; and
  execute a cascading rule identified in the action, the cascading rule to cause the event to be resolved at other storage entities associated with the storage entity corresponding to the event.

17. The system of claim 16, wherein the event comprises at least one of a fault in the storage entity or a monitored resource of the storage entity triggering a threshold value configured for the monitored resource.

18. The system of claim 16, wherein the storage entity comprises at least one of a storage node, a volume, a cluster, or a brick.

19. The system of claim 16, wherein the plurality of storage services comprise at least one of GlusterFS® file system or Ceph® file system, and wherein the USM provides a framework to receive a plugin application from each of the plurality of storage services that enables the USM to manage the respective storage service.

20. The system of claim 16, wherein the action comprises notifying a user of the event, and wherein the rule set comprises contact information of the user.

\* \* \* \* \*